(12) United States Patent
Arp et al.

(10) Patent No.: US 12,710,783 B2
(45) Date of Patent: Aug. 18, 2026

(54) CLOCK SYNCHRONIZATION IN A MULTICHIP MODULE

(71) Applicant: INTERNATIONAL BUSINESS MACHINES CORPORATION, Armonk, NY (US)

(72) Inventors: Andreas H.A. Arp, Nufringen (DE); Daniel Mark Dreps, Georgetown, TX (US); Douglas J. Malone, Pleasant Valley, NY (US); Bruce George Rudolph, Rochester, MN (US); Ching Lung Tong, Highland Mills, NY (US); Glen A. Wiedemeier, Austin, TX (US); Lily Jielu Zhang, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/644,595

(22) Filed: Apr. 24, 2024

(65) Prior Publication Data

US 2025/0334999 A1 Oct. 30, 2025

(51) Int. Cl.
*G06F 1/10* (2006.01)

(52) U.S. Cl.
CPC .................................... *G06F 1/10* (2013.01)

(58) Field of Classification Search
CPC ................ G06F 1/08; G06F 1/10; G06F 1/12
See application file for complete search history.

(56) References Cited

U.S. PATENT DOCUMENTS 7,382,844 B2 6/2008 Hwang et al.
9,154,142 B2 10/2015 Dobbs et al.
9,432,025 B1 * 8/2016 Khor .................... H03L 7/0891
9,548,858 B1 * 1/2017 Cirit ...................... H04L 7/0332
10,564,664 B2 * 2/2020 Arp ................. H03K 19/00323
11,082,034 B1 * 8/2021 Arp .......................... H03K 5/14
11,190,191 B2 11/2021 Wolkovitz et al.
11,283,589 B2 3/2022 Gupta et al.
11,385,675 B2 7/2022 Chang et al.
11,842,896 B2 12/2023 Kuo et al.
11,842,986 B1 12/2023 Ramin
2008/0150605 A1 * 6/2008 Chueh ...................... G06F 1/10 327/292
2021/0152269 A1 5/2021 Loinaz
(Continued)

OTHER PUBLICATIONS

Dunne et al., Quad Module Hybrid Development for the Atlas Pixel Layer Upgrade, Proceedings of Science, vol. 313, PoS TWEPP-17 (2017) 065, Topical Workshop on Electronics for Particle Physics, Santa Cruz, Ca, United States of America, Sep. 11-15, 2017, DOI: 10.22323/1.313.0065, Published: Mar. 20, 2018, 5 pages.
(Continued)

*Primary Examiner* — Raymond N Phan
(74) *Attorney, Agent, or Firm* — Onyx IP Group

(57) ABSTRACT

Clock synchronization in a multichip module is provided. Relative clock skews among a plurality of digital devices are detected based on a pairwise exchange of clock signals between digital devices. In some aspects, the plurality of digital devices comprising at least one noncommunicating pair of digital devices. Based on the relative clock skews of the various devices, the respective clock signals of the plurality of digital devices are deskewed.

20 Claims, 10 Drawing Sheets

(56) References Cited

U.S. PATENT DOCUMENTS

2023/0016311 A1* 1/2023 Kuang ...................... G06F 1/08
2023/0077591 A1 3/2023 Farjadrad
2023/0236999 A1 7/2023 Azadet et al.
2023/0244628 A1 8/2023 Srinivasan et al.
2023/0317127 A1 10/2023 Schmidt et al.
2023/0393610 A1 12/2023 Malone et al.

OTHER PUBLICATIONS

Egan et al., Synchronous Chip-to-Chip Communication with an Multi-Chip Resonator Clock Distribution Network, Superconductor Science and Technology, vol. 35, No. 10, DOI 10.1088/1361-6668/ac8e38, dated Apr. 28, 2021, 8 pages.
Li et al., Scaling Deep-Learning Inference with Chiplet-based Architecture and Photonic Interconnects, 2021 58th ACM/IEEE Design Automation Conference (DAC), DOI: 10.1109/DAC18074.2021.9586311, Date Added to IEEE Xplore: Nov. 8, 2021, 6 pages.
Shao et al., Simba: Scaling Deep-Learning Inference with Multi-Chip-Module-Based Architecture, ACM, Digital Library, Micro '52: Proceedings of the 52nd Annual IEEE/ACM International Symposium on Microarchitecture, https://people.eecs.berkeley.edu/~ysshao/assets/papers/shao2019-micro.pdf, dated Oct. 2019, 14 pages.
Zimmer et al., A 0.32-128 Tops, Scalable Multi-Chip-Module-based Deep Neural Network Inference Accelerator with Ground-Referenced Signaling in 16nm, IEEE Journal of Solid-State Circuits, vol. 55, Issue 4, Apr. 2020, DOI: 10.1109/JSSC.2019.2960488, Date of Publication: Jan. 14, 2020, 10 pages.

* cited by examiner

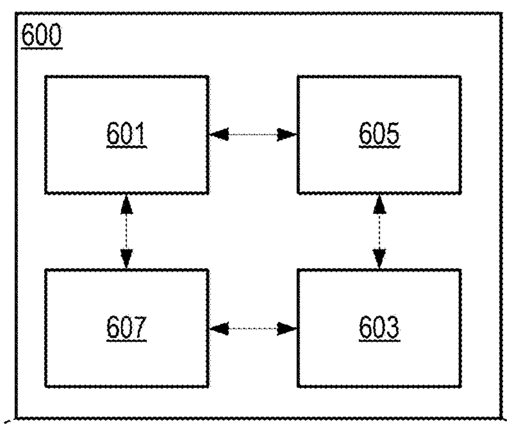

Detect Relative Clock Skews Among A Plurality Of Digital Devices Based On A Pairwise Exchange Of Clock Signals Between Digital Devices, The Plurality Of Digital Devices Comprising At Least One Noncommunicating Pair Of Digital Devices, Wherein The Plurality Of Digital Devices Includes A First Digital Device, A Second Digital Device, A Third Digital Device, And A Fourth Digital Device 602

Deskew, Based On The Relative Clock Skews, Respective Clock Signals Of The Plurality Of Digital Devices 604

Set A Target Clock Frequency In Response To The Deskewing 606

FIG. 6

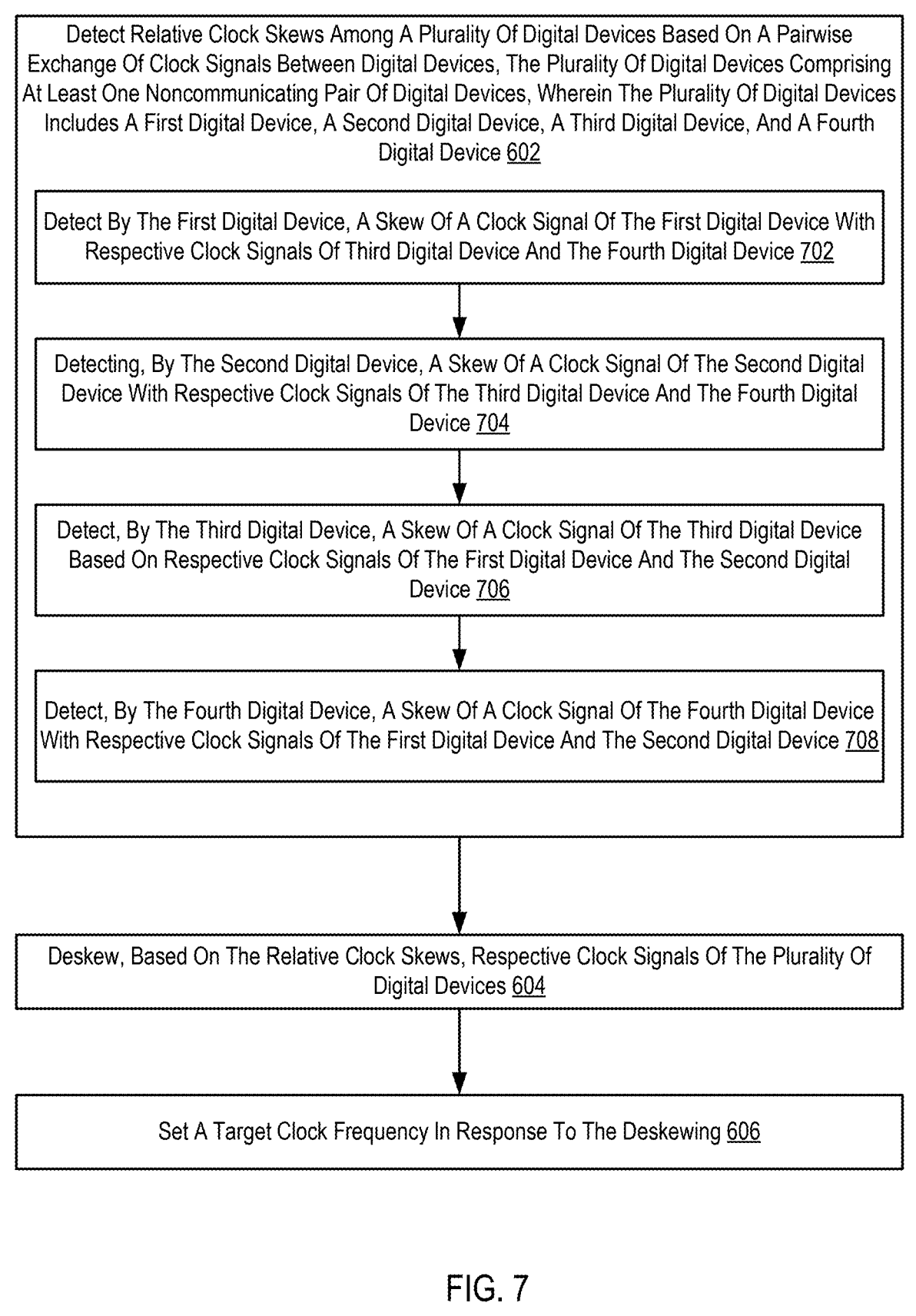

Detect Relative Clock Skews Among A Plurality Of Digital Devices Based On A Pairwise Exchange Of Clock Signals Between Digital Devices, The Plurality Of Digital Devices Comprising At Least One Noncommunicating Pair Of Digital Devices, Wherein The Plurality Of Digital Devices Includes A First Digital Device, A Second Digital Device, A Third Digital Device, And A Fourth Digital Device 602

Detect By The First Digital Device, A Skew Of A Clock Signal Of The First Digital Device With Respective Clock Signals Of Third Digital Device And The Fourth Digital Device 702

Detecting, By The Second Digital Device, A Skew Of A Clock Signal Of The Second Digital Device With Respective Clock Signals Of The Third Digital Device And The Fourth Digital Device 704

Detect, By The Third Digital Device, A Skew Of A Clock Signal Of The Third Digital Device Based On Respective Clock Signals Of The First Digital Device And The Second Digital Device 706

Detect, By The Fourth Digital Device, A Skew Of A Clock Signal Of The Fourth Digital Device With Respective Clock Signals Of The First Digital Device And The Second Digital Device 708

Deskew, Based On The Relative Clock Skews, Respective Clock Signals Of The Plurality Of Digital Devices 604

Set A Target Clock Frequency In Response To The Deskewing 606

FIG. 7

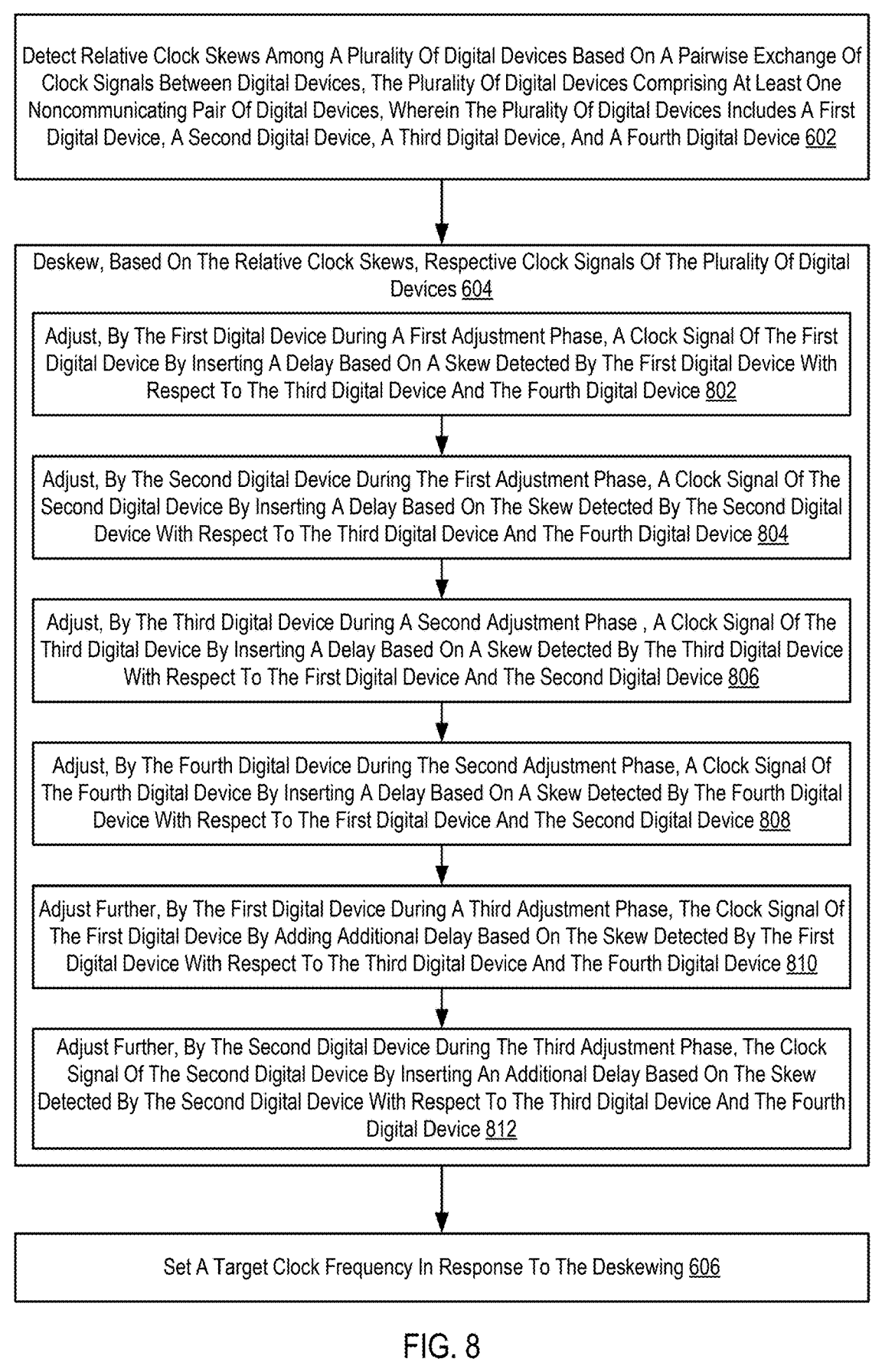

Detect Relative Clock Skews Among A Plurality Of Digital Devices Based On A Pairwise Exchange Of Clock Signals Between Digital Devices, The Plurality Of Digital Devices Comprising At Least One Noncommunicating Pair Of Digital Devices, Wherein The Plurality Of Digital Devices Includes A First Digital Device, A Second Digital Device, A Third Digital Device, And A Fourth Digital Device 602

Deskew, Based On The Relative Clock Skews, Respective Clock Signals Of The Plurality Of Digital Devices 604

Adjust, By The First Digital Device During A First Adjustment Phase, A Clock Signal Of The First Digital Device By Inserting A Delay Based On A Skew Detected By The First Digital Device With Respect To The Third Digital Device And The Fourth Digital Device 802

Adjust, By The Second Digital Device During The First Adjustment Phase, A Clock Signal Of The Second Digital Device By Inserting A Delay Based On The Skew Detected By The Second Digital Device With Respect To The Third Digital Device And The Fourth Digital Device 804

Adjust, By The Third Digital Device During A Second Adjustment Phase , A Clock Signal Of The Third Digital Device By Inserting A Delay Based On A Skew Detected By The Third Digital Device With Respect To The First Digital Device And The Second Digital Device 806

Adjust, By The Fourth Digital Device During The Second Adjustment Phase, A Clock Signal Of The Fourth Digital Device By Inserting A Delay Based On A Skew Detected By The Fourth Digital Device With Respect To The First Digital Device And The Second Digital Device 808

Adjust Further, By The First Digital Device During A Third Adjustment Phase, The Clock Signal Of The First Digital Device By Adding Additional Delay Based On The Skew Detected By The First Digital Device With Respect To The Third Digital Device And The Fourth Digital Device 810

Adjust Further, By The Second Digital Device During The Third Adjustment Phase, The Clock Signal Of The Second Digital Device By Inserting An Additional Delay Based On The Skew Detected By The Second Digital Device With Respect To The Third Digital Device And The Fourth Digital Device 812

Set A Target Clock Frequency In Response To The Deskewing 606

FIG. 8

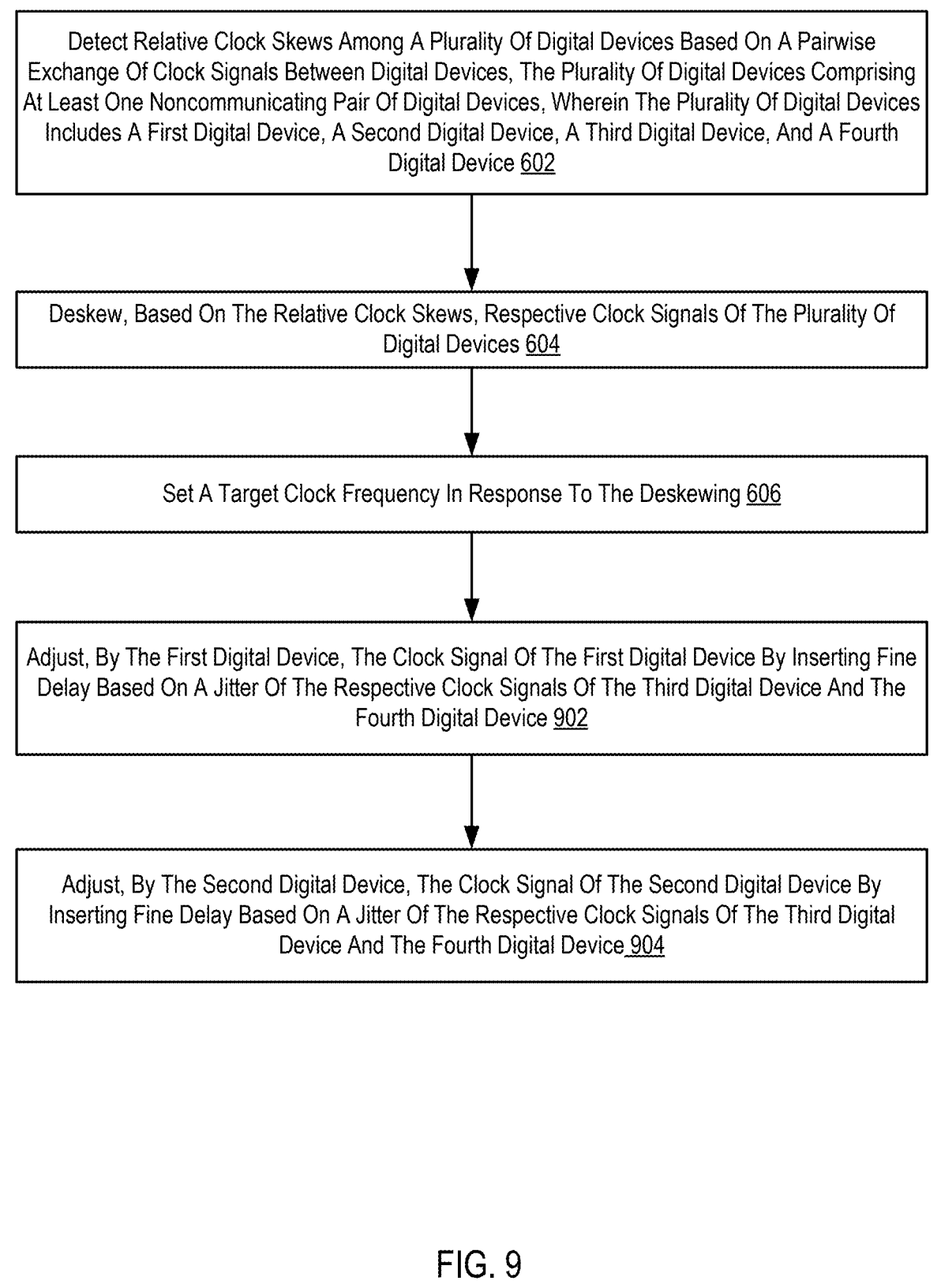

Detect Relative Clock Skews Among A Plurality Of Digital Devices Based On A Pairwise Exchange Of Clock Signals Between Digital Devices, The Plurality Of Digital Devices Comprising At Least One Noncommunicating Pair Of Digital Devices, Wherein The Plurality Of Digital Devices Includes A First Digital Device, A Second Digital Device, A Third Digital Device, And A Fourth Digital Device 602

Deskew, Based On The Relative Clock Skews, Respective Clock Signals Of The Plurality Of Digital Devices 604

Set A Target Clock Frequency In Response To The Deskewing 606

Adjust, By The First Digital Device, The Clock Signal Of The First Digital Device By Inserting Fine Delay Based On A Jitter Of The Respective Clock Signals Of The Third Digital Device And The Fourth Digital Device 902

Adjust, By The Second Digital Device, The Clock Signal Of The Second Digital Device By Inserting Fine Delay Based On A Jitter Of The Respective Clock Signals Of The Third Digital Device And The Fourth Digital Device 904

FIG. 9

CLOCK SYNCHRONIZATION IN A MULTICHIP MODULE

BACKGROUND

The present disclosure relates to methods, apparatus, and products for clock synchronization in a multichip module. Clocks of the various devices in a multichip module should be synchronized to maximize the performance of synchronous data transfer. Skew between two clock signals increases latency and impacts performance. As the number of devices and independent clock sources in the multichip module increases, the difficulty of clock synchronization also increases.

SUMMARY

According to embodiments of the present disclosure, various methods, apparatus and products for clock synchronization in a multichip module are described herein. In some aspects, clock synchronization in a multichip module includes detecting relative clock skews among a plurality of digital devices based on a pairwise exchange of clock signals between digital devices. In some aspects, the plurality of digital devices include at least four digital devices in which there is at least one noncommunicating pair of digital devices. Based on the relative clock skews of the various devices, the respective clock signals of the digital devices are deskewed.

BRIEF DESCRIPTION OF THE DRAWINGS

FIG. 6 sets forth a flow chart of an example method for clock synchronization in a multichip module in accordance with at least one embodiment of the present disclosure.

FIG. 7 sets forth another flow chart of another example method for clock synchronization in a multichip module in accordance with at least one embodiment of the present disclosure.

FIG. 8 sets forth a flow chart of another example method for clock synchronization in a multichip module in accordance with at least one embodiment of the present disclosure.

FIG. 9 sets forth a flow chart of an example method for clock synchronization in a multichip module in accordance with at least one embodiment of the present disclosure.

DETAILED DESCRIPTION

Chip-to-chip interfaces on multichip modules will suffer performance penalties due to added latency that results when the clocks of two chips are asynchronous or meso-synchronous (synchronous with an unknown phase relationship). Embodiments in accordance with the present disclosure provide a mechanism to synchronize the clocks of four or more chips in a multichip module, such that the latency on the chip-to-chip interfaces is minimized, thereby maximizing the performance of synchronous data transfer across these interfaces.

Figure 1:
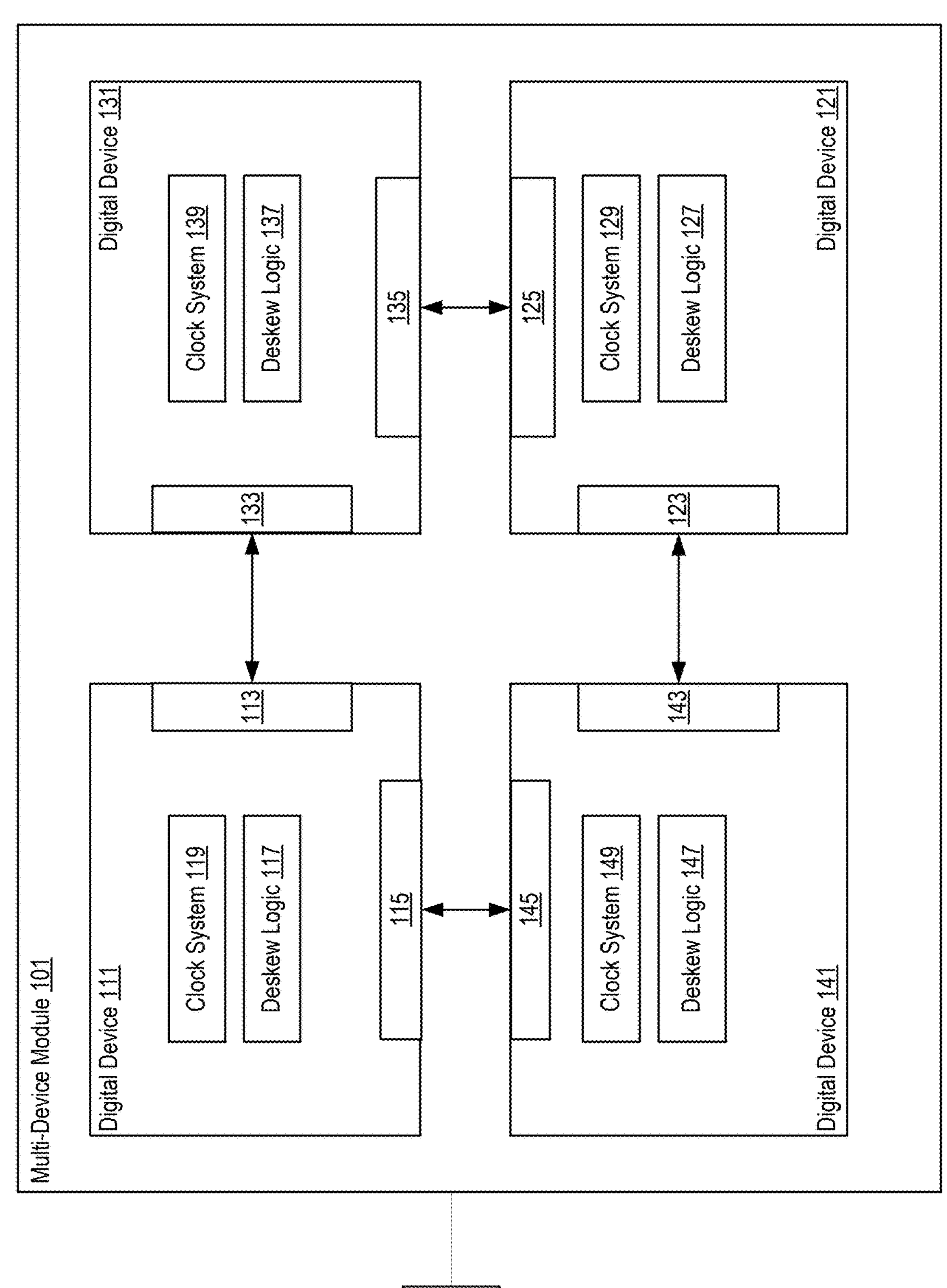
FIG. 1 sets forth an example multidevice module for clock synchronization in a multichip module in accordance with at least one embodiment of the present disclosure.

FIG. 1 sets forth a block diagram of an example system 100 including a multidevice module 101 for clock synchronization in a multichip module in accordance with at least one embodiment of the present disclosure. The multidevice module 101 an electronic assembly (e.g., a semiconductor package) where multiple digital devices 111, 121, 131, 141 are integrated on a unifying substrate (e.g., a printed circuit board (PCB) or interposer). The digital devices 111, 121, 131, 141 may be heterogenous or homogenous devices. The digital devices 111, 121, 131, 141 may be arranged linearly as depicted (e.g., IC fanout), stacked, or otherwise integrated using package architectures and techniques such as multichip module (MCM), System-in-Package (SiP), interposers, embedded bridges, and the like. The digital devices 111, 121, 131, 141 may be any type of integrated circuit (i.e., 'IC' or 'chip'), semiconductor die, or other discrete component such as a processor (e.g., CPU, GPU, digital signal processor (DSP), accelerator, etc.), application specific integrated circuit (ASIC), programmable logic device (e.g., Field Programmable Gate Array (FPGA)), a microcontroller, and the like.

In the example of FIG. 1, digital device 111 includes an interface 113 for communication and data transfer with the interface 133 of digital device 131. Digital device 111 also includes interface 115 for communication and data transfer with interface 145 of digital device 141. Digital device 121 includes interface 125 for communication and data transfer with interface 135 of digital device 131. Digital device 121 also includes interface 123 for communication and data transfer with interface 143 of digital device 141. To facilitate synchronous data transfer between adjacent pairs of digital devices, it is important to minimize the skew between clocks of the paired digital devices.

Each digital device 111, 121, 131, 141 includes millions of transistors that are switched on and off in accordance with a respective local clock system 119, 129, 139, 149. In some examples, each local clock system 119, 129, 139, 149 is driven by a common clock source (not shown), which may be disposed on any of the digital devices, elsewhere in the multidevice module 101, or remote from the multidevice module 101. Each local clock system 119, 129, 139, 149 includes a local clock driver that drives a clock signal through a clock distribution network (referred to herein a 'clock tree') that switches the transistors of the digital device. Given the size and complexity of a clock system, each local clock system 119, 129, 139, 149 is associated with a degree of intrinsic latency. That is, the propagation of clock signals from the clock source through a clock distribution network tree requires a certain amount of time, referred to herein as 'clock tree latency.' In the example of FIG. 1, the clock tree latency of digital device 111 may differ from the clock tree latency of digital device 131. For illustrative purposes, the clock tree latency of digital device 111 may be 1100 picoseconds while the clock tree latency of digital device 131 may be 1160 picoseconds. The difference in latency of the clock signals of two digital devices is shown by the alignment or misalignment of the rising and/or falling edges of the respective clock signals. The quantitative difference between the common edges of the different clock signals is referred to as the clock skew between two digital devices. Using the previous illustrative example, the clock skew of digital device 111 and digital device 131 is represented by a skew of 60 picoseconds. Clock skew affects the ability of two digital devices to function cooperatively and can have deleterious effects on the operation the multidevice module 101. While some amount of clock skew may be within certain tolerances, it is important to minimize clock skew to enable communication and cooperation among the digital devices 111, 121, 131, 141.

Typically, the skew between two clocks, e.g. the clocks of digital device 111 and digital device 131, is minimized by aligning edges of the same type, either the rising edge or the falling edge of the two clock signals. Minimizing the skew between two clocks of different digital devices is referred to herein as 'deskewing.' A clock tree of the clock to be deskewed with respect to another clock is increased or decreased by the minimum amount required to align two edges of the same type. Using the minimum amount required may have the advantage that less time may be required to deskew the two clocks. The clock tree latency of the clock to be deskewed with respect to the other clock is increased by the minimum amount required to align two edges of the same type if the clock to be deskewed with respect to the other clock is early with respect to the other clock. The clock tree latency can be increased by adding delay in the local clock system of the clock to be deskewed. As will be described in more detail below, once delay is added, deskewing can be further refined by removing added delay.

To that end, each digital device 111, 121, 131, 141 includes deskew logic 117, 127, 137, 147 for deskewing its local clock system with respect to those of other digital devices with which it communicates. In the example of FIG. 1, digital device 111 deskews its clock signal in relation to the respective clocks signals of digital device 131 and digital device 141; digital device 121 deskews its clock signal in relation to the respective clocks signals of digital device 131 and digital device 141; digital device 131 deskews its clock signal in relation to the respective clocks signals of digital device 111 and digital device 121; and digital device 141 deskews its clock signal in relation to the respective clocks signals of digital device 111 and digital device 121. As digital device 111 and digital device 121 are a noncommunicating pair, those devices cannot directly deskew their respective local clocks in relation to one another. As digital device 131 and digital device 141 are a noncommunicating pair, those devices cannot directly deskew their respective local clocks in relation to one another.

To coordinate the deskewing of the digital devices 111, 121, 131, 141, particular in the presence of noncommunicating pairs of digital devices, system 100 includes a deskew orchestration program 103. The deskew orchestration program 103 orchestrates the deskewing the of the digital devices 111, 121, 131, 141 by communicating with deskew logic 117, 127, 137, 147 to coordinate deskewing among the digital devices in multiple deskewing adjustment phases. The deskew orchestration program 103 may be embodied in a set of executable instructions implemented in firmware or software. For example, the deskew orchestration program 103 may be a component of a firmware driver of the multidevice module 101. In such an example, the deskew orchestration program 103 may be stored on the multidevice module 101. In another example, the deskew orchestration program 103 may be stored in storage remote from the multidevice module 101. For example, the deskew orchestration program 103 may be implemented as software that is stored in system storage of a computing system that includes the multidevice module 101. The deskew orchestration program 103 will be described in more detail below.

Figure 2:
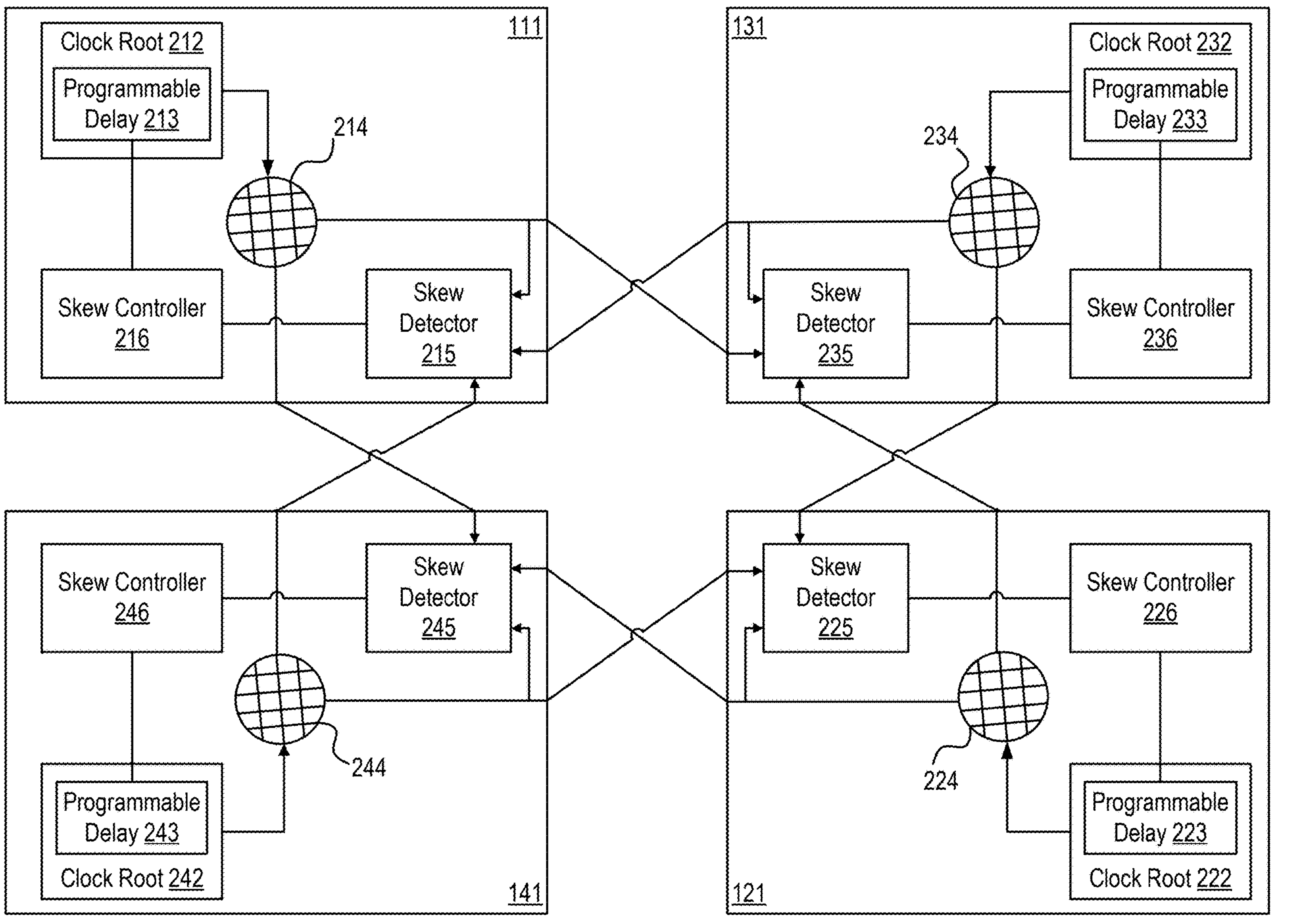
FIG. 2 sets forth an example multidevice module with deskew logic for clock synchronization in a multichip module in accordance with at least one embodiment of the present disclosure.

For further explanation, FIG. 2 sets forth a detailed illustration of the clock systems and deskew logic of the multidevice module 101 for clock synchronization in a multichip module in accordance with the present disclosure. Each digital device 111, 121, 131, 141 includes a clock root 212, 222, 232, 242 that drives a clock distribution network, i.e., the respective clock trees 214, 224, 234, 244 of the digital devices. Each digital device 111, 121, 131, 141 also includes a respective deskew controller 216, 226, 236, 246 that receives skew information from a respective skew detector 215, 225, 235, 245. Although, one skew detector is shown in each digital device, it will be appreciated that the function of a skew detector as described herein may be realized by multiple skew detectors in a given digital device. For example, there may be a skew detector for each device-to-device interface. In the example of FIG. 2, the skew detector 215 of digital device 111 receives its local clock signal from its local clock tree 214 as well as the clock signal from the clock tree 234 of digital device 131 and the clock signal from the clock tree 244 of digital device 141. Thus, the skew detector 215 of digital device 111 detects the skew of its local clock with respect to the clocks of digital device 131 and digital device 141. The skew detector 225 of digital device 121 receives its local clock signal from its local clock tree 224 as well as the clock signal from the clock tree 234 of digital device 131 and the clock signal from the clock tree 244 of digital device 141. Thus, the skew detector 225 of digital device 121 detects the skew of its local clock with respect to the clocks of digital device 131 and digital device 141. The skew detector 235 of digital device 131 receives its local clock signal from its local clock tree 234 as well as the clock signal from the clock tree 214 of digital device 111 and the clock signal from the clock tree 224 of digital device 121. Thus, the skew detector 235 of digital device 131 detects the skew of its local clock with respect to the clocks of digital device 111 and digital device 121. The skew detector 245 of digital device 141 receives its local clock signal from its local clock tree 244 as well as the clock signal from the clock tree 214 of digital device 111 and the clock signal from the clock tree 224 of digital device 121. Thus, the skew detector 245 of digital device 141 detects the skew of its local clock with respect to the clocks of digital device 111 and digital device 121.

Each deskew controller 216, 226, 236, 246 uses the skew information received from the skew detectors 215, 225, 235, 245 to configure the respective programmable delay 213, 223, 233, 243 of the digital devices. In some examples, the deskew controller 216, 226, 236, 246 configures the programmable delay 213, 223, 233, 243 to insert or remove delay in the clock signal that is propagated to the clock tree. Inserted delay is measured as a fixed time interval that is referred to herein as a 'step.' These steps are added or removed in the programmable delay in fixed increments. In some implementations, the deskew controller 216, 226, 236, 246 configures the programmable delay 213, 223, 233, 243 to insert or remove coarse delay or fine delay, where a coarse delay step is larger than a fine delay step. Thus, adding a coarse delay step adds a larger time interval of delay than adding a fine delay step. Accordingly, the deskew controller configures the programmable delay to add and remove coarse delay and fine delay in order to deskew the respective clock signals of the respective digital devices 111, 121, 131, 141. In some implementations, adding coarse delay is performed use a multiplexor (not shown) that multiplexes multiple delay paths of different delay lengths. Each delay path may include a different amount of intrinsic delay due to different components in the delay path. For example, different delay paths may include different numbers of inverters and thus include different amounts of intrinsic delay, or the difference in delay paths may be based on process variations such as silicon and metal speed. In such implementations, the deskew controller can add coarse delay in the programmable delay by selecting, via the multiplexor, a particular delay path associated with the desired amount of coarse delay. In some implementations, adding fine delay is performed by selecting or deselecting a number of parallel transistors, or transistor fingers, in the clock root. For example, reducing the number of active transistor fingers in the clock root adds slew to the clock signal, which increases clock delay in the clock tree. In these implementations, the programmable delay may include selection logic to select the number of parallel transistors that are used to drive the clock signal.

The amount of delay that the deskew controller 216, 226, 236, 246 adds or removes via the programmable delay is based on the skew information received from the skew detector 215, 225, 235, 245. Each skew detector 215, 225, 235, 245 is a quantitative skew detector that provides a numerical amount of skew detected between two clock signals. In some examples, the skew detector provides an output indicating the skew detected between each pair of clock signals. In other examples, the skew detector simply outputs the largest skew detected between its local clock signal and all other measured clock signals. Each skew detector 215, 225, 235, 245 determines a quantitative skew based on the clock offset between two clock signals.

Figure 3:
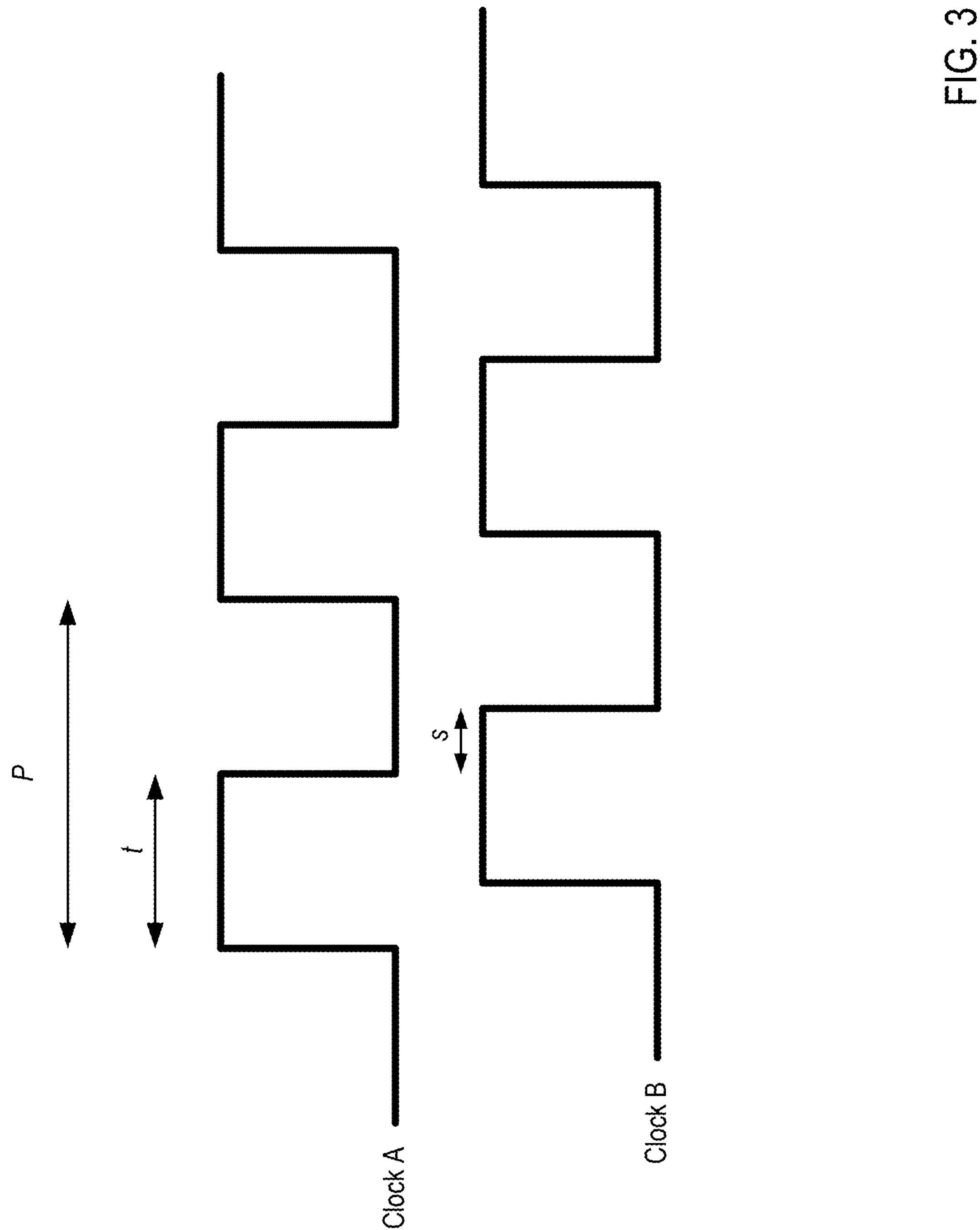
FIG. 3 sets forth an example timing diagram of two example clock signals, consistent with embodiments of the present disclosure.

For further explanation, FIG. 3 sets forth an example timing diagram of two example clock signal consistent with embodiments of the present disclosure. Each clock signal has a period p. In the example of FIG. 3, both clock signals clock A and clock B are shown with the same period, although it will be understood that clocks may operate at different frequencies and thus have different periods. Where one digital device is intended to operate at a higher frequency, the clock period of the faster clock should be a multiple of period of the slower clock. The clock signals clock A and clock B also have a duty cycle t. As can be seen in FIG. 3, the falling edges of clock A and clock B are not aligned. Specifically, clock B is 'late' in that the falling edge of clock B occurs later than the falling edge of clock A. The difference between these two edges represents the skew s. For example, the skew may be, for example, 60 picoseconds. In which case, a skew detector would output a skew of 60 picoseconds for these two clock signals.

Figure 4:
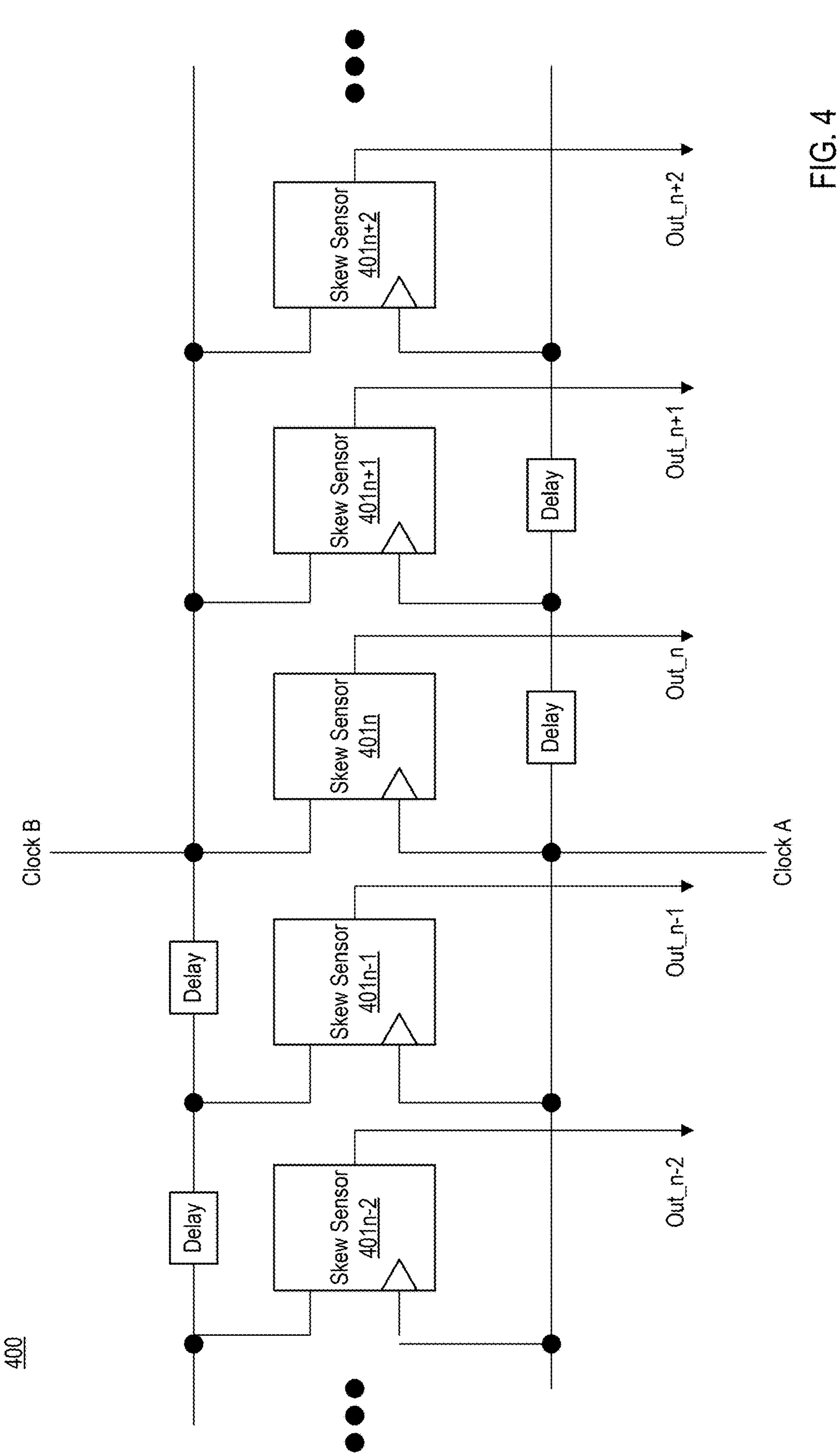
FIG. 4 sets forth an example skew detector for clock synchronization in a multichip module in accordance with at least one embodiment of the present disclosure.

For further explanation, FIG. 4 sets forth a diagram of an example quantitative skew detector 400 for clock synchronization in a multichip module in accordance with at least one embodiment of the present disclosure. The quantitative skew detector 400 includes an array of skew sensors $\mathbf{401}_{n-2}$, $\mathbf{401}_{n-1}$, $\mathbf{401}_{n}$, $\mathbf{401}_{n+1}$, $\mathbf{401}_{n+2}$. Each skew sensor may be, for example, a latch where an edge (e.g., the falling edge) of clock A is captured and the corresponding edge of clock B is detected. When the edges align, the skew sensor outputs a '1.' Otherwise, the skew sensor outputs a '0.' As shown in FIG. 4, an amount of delay is successively added to the clock A signal moving from left to right such that each skew sensor $\mathbf{401}_{n+1}$, $\mathbf{401}_{n+2}$ receives clock A with an increasing amount of delay. In some examples, each delay is a fixed amount of delay. Similarly, an amount of delay is successively added to the clock B signal moving from right to left such that each skew sensor $\mathbf{401}_{n-1}$, $\mathbf{401}_{n-2}$ receives clock B with an increasing amount of delay. Skew sensor $\mathbf{401}_{n}$ receives clock A and clock B with no delay.

Consider an example, greatly simplified for explanatory purposes, where clock B is 60 picoseconds behind clock A and where each delay adds 30 picoseconds. Skew sensor 401*n* will output a '0' because the edges of clock A and clock B are not aligned. Skew sensor 401*n*+1 will output a '0' because the edges of clock A and clock B are still not aligned even with 30 picoseconds of delay added to clock A. Skew sensor 401*n*+2 will output a '1' because the 60 picoseconds of delay that was added to clock A will cause the edges of clock A and clock B to be aligned. If the situation was reversed and clock A was 60 picoseconds late with respect to clock B, skew sensor $\mathbf{401}_{n-2}$ would output a '1.' Based on the outputs of the skew sensors and the given amount of delay that is associated with each skew sensor, the skew detector 400 outputs a quantitative measure of the skew among connected clocks.

In one example deskewing process, the deskewing logic of each digital device is activated sequentially and in stages. In the example of FIG. 2, digital device 111 and digital device 121 are primary devices in the deskewing process and digital device 131 and digital device 141 are secondary devices. To begin the deskew process, the clocks are first set to a low frequency. The deskewing process may begin during system initialization, before the digital devices are brought to a target operating frequency. During initialization, because no workload is operating on the multidevice module 101, large changes to the clock (e.g., by adding coarse delay) will not interfere with the operation of the multidevice module 101. Once the digital devices are placed in the operating state, after setting the target clock frequency, relatively small delay added to the clocks in the form of fine delay may be within tolerances, but adding coarse delay during the operational state would interfere with the execution of a workload on the multidevice module 101.

In a first adjustment stage, for primary digital devices, the first digital device 111 adjusts its clock for skew relative to digital device 131 and digital device 141. The deskew controller 216 determines the largest skew between its local clock signal and the clock signal of digital device 131 and 141. In some implementations, the deskew controller first increases the fine delay to 50% of the potential (e.g., by setting half of the transistors in the clock root to 'off'). If the clock of digital device 111 is earlier than either digital device 131 or digital device 141, the deskew controller 216 adds coarse delay until the clock of digital device 111 is the latest clock. Even if the clock of digital device 111 is already the latest clock, coarse delay may be added to allow flexibility for further clock adjustment.

The clock of the second primary digital device 121 is adjusted based on digital device 131 and digital device 141. The deskew controller 226 determines the largest skew between its local clock signal and the clock signal of digital device 131 and 141. In some implementations, the deskew controller 226 first increases the fine delay to 50% of the potential (e.g., by setting half of the transistors in the clock root to 'off'). If the clock of digital device 121 is earlier than either digital device 131 or digital device 141, the deskew controller 226 adds coarse delay until the clock of digital device 121 is the latest clock. Even if the clock of digital device 111 is already the latest clock, coarse delay may be added to allow flexibility for further clock adjustment.

In a second adjustment phase, for secondary digital devices, the first secondary device 131 adjusts its local clock relative to those of the primary digital devices 111, 121. In some implementations, the deskewing control 236 adjusts its local clock until it is the latest clock by adding coarse delay. The deskew controller 236 then reduces the coarse delay by one step. If the local clock of digital device 131 is no longer the latest clock, the 236 then inserted fine delay until the local clock of digital device 131 is deskewed relative those of the primary digital device 111, 121. Likewise, in the second adjustment phase, the second secondary device 141 adjusts its local clock relative to those of the primary digital devices 111, 121. In some implementations, the deskewing control 246 adjusts its local clock until it is the latest clock by adding coarse delay. The deskew controller 246 then reduces the coarse delay by one step. If the local clock of digital device 141 is no longer the latest clock, the 246 then inserts fine delay until the local clock of digital device 141 is deskewed relative the latest clock of the primary digital device 111, 121. At this point, the clocks of digital device 131 and digital device 141 have been adjusted to the same point, and are thus deskewed.

In a third adjustment phase, for primary digital devices, the first digital device 111 further adjusts its local clock relative to those of the secondary digital devices 131, 141. The deskew controller 216 adds coarse delay to an optimal setting to minimize skew relative to the secondary digital devices 131, 141. That is, coarse delay is added such that the difference between the offsets of the clock edges, regardless of which clock is earlier or later, is the smallest. For example, adding coarse delay by one step may result in the clock of digital device 111 being 40 picoseconds earlier than the clocks of digital devices 131, 141, and adding coarse delay by two steps may result in the clock of digital device being 10 picoseconds later than the clocks of digital devices 131, 141, in which case adding two steps of coarse delay is the optimal amount. The optimal delay setting to minimize skew can be determined based on the outputs of the quantitative skew sensor or through a binary search to identify the smallest offset. Similarly, during the third adjustment phase, deskew controller 226 of the second primary digital device adds coarse delay to an optimal setting relative to the secondary digital devices 131, 141.

At this point, the skew among the digital devices 111, 121, 131, 141 has been minimized, and the clocks of the devices can be set to the target operational frequencies. During an operational phase, the clocks of the secondary devices 131, 141 remain set to the target frequency, while the clocks of the primary devices 111, 121 are deskewed as necessary relative to the clocks of the secondary devices 131, 141 by adding fine delay. For example, the clocks of the secondary devices 131, 141 may experience a degree of jitter during operation as a result of voltage drooping and other factors. In this case, the clock of primary device 111 is deskewed relative to the clocks of the secondary devices 131, 141 by adding fine delay until the clock of digital device 111 is centered within the range of jitter experienced by secondary devices 131, 141. Likewise, the clock of primary device 121 is deskewed relative to the clocks of the secondary devices 131, 141 by adding fine delay until the clock of digital device 121 is centered within the range of jitter experienced by secondary devices 131, 141.

Figure 5:
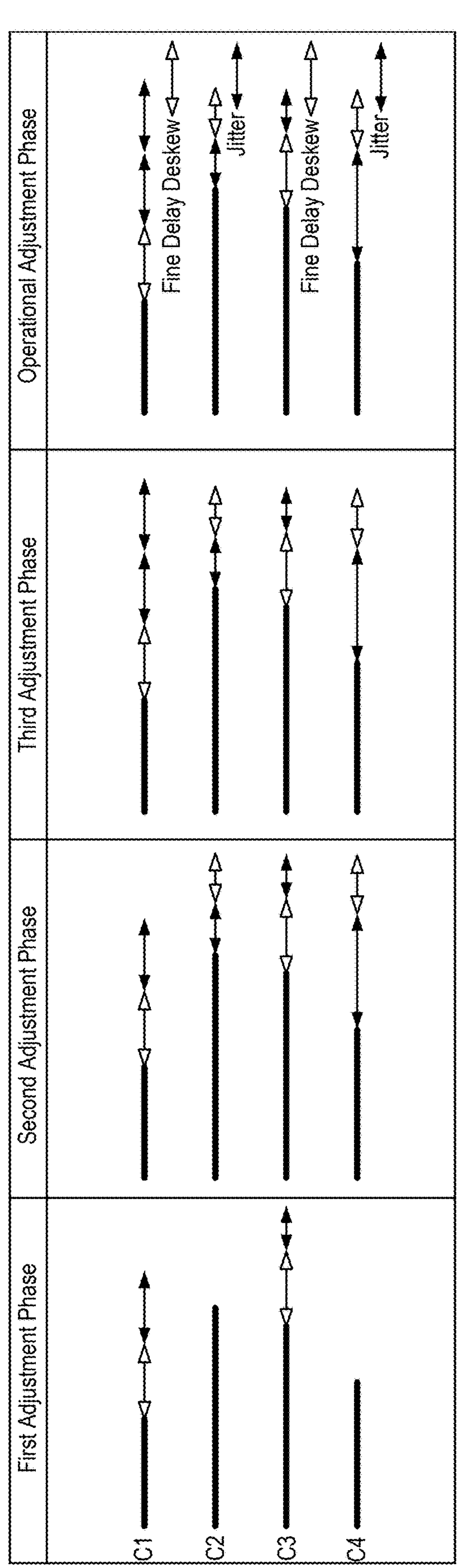
FIG. 5 sets forth an example deskew operation for clock synchronization in a multichip module in accordance with at least one embodiment of the present disclosure.

For further explanation, FIG. 5 sets forth an illustrative example of clock synchronization in a multichip module consistent with aspects of the present disclosure. FIG. 5 shows a delay diagram 500 of four example chips of a multidevice module as well as their intrinsic delay based on clock latency. Chips 1 (C1) and chip 3 (C3) are primary devices, while chip 2 (C2) and chip 4 (C4) are secondary devices. It can be seen that chip 2 has the longest delay (i.e., the latest clock signal), while chip 1 has the shortest delay. This base delay is represented by the arrowless line. In FIG. 5, coarse delay is represented by a solid arrowed line, while fine delay is represented by an outlined arrowed line. In the example of FIG. 5, during the first adjustment phase, the fine delay of chip 1 is set to 50% and the coarse delay of chip 1 is increased until chip 1 has the largest delay of chips 1, 2, and 4. Independently, the fine delay of chip 3 is set to 50% and the coarse delay of chip 3 is increased until chip 3 has the largest delay of chips 2, 3, and 4. Even though increasing the fine delay to 50% resulted in a larger delay in chip 3 than in chips 2 and 4, additional coarse delay is added to allow greater flexibility for further adjustment.

During the second adjustment phase, coarse delay is added to chip 2 until the delay in chip 2 is greater than the delay in chips 1 and 3. The coarse delay is then rolled back by one step, and the fine delay is added, if necessary, to deskew the clock of chip 2 relative to the largest delay among chips 1 and 3 (in this case, chip 3). Thus, the clock of chip 2 and the clock of chip 3 are deskewed. Independently, during the second adjustment phase, coarse delay is added to chip 4 until the delay in chip 4 is greater than the delay in chips 1 and 3. The coarse delay is then rolled back by one step, and the fine delay is added, if necessary, to deskew the clock of chip 4 relative to the largest delay among chips 1 and 3 (in this case, chip 3).

In the third adjustment phase, coarse delay is added to chip 1 to the optimal setting that minimizes skew relative to the clocks of chips 2 and 4. Fine delay can be added to bring the clock of chip 1 as close as possible to the clocks of chips 2 and 4. For example, if the optimal setting for coarse delay results in the clock of chip 1 being earlier than chips 2 and 4, additional fine delay can be added. During the third adjustment phase, independently, coarse delay is added to chip 3 to the optimal setting that minimizes skew relative to the clocks of chips 2 and 4.

During the operational phase, the clocks of chips 2 and 4 are not adjusted. To deskew chips 1 and 3 relative to chips 2 and 4, fine delay is added or subtracted to center the clocks of chips 1 and 3 on the center of the jitter experienced by chips 2 and 4.

In some examples, each of these deskewing steps is initiated by the deskew orchestration program described above. For example, the deskew orchestration program signals to the deskew controller of each digital device when it is time for the deskew controller to carry out a particular stage or step of the deskew process described above.

For further explanation, FIG. 6 sets forth an example flow chart of an example method of clock synchronization in a multichip module in accordance with at least one embodiment of the present disclosure. The example method of FIG. 6 includes detecting 602 relative clock skews among a plurality of digital devices based on a pairwise exchange of clock signals between digital devices the plurality of digital devices comprising at least one noncommunicating pair of digital devices, wherein the plurality of digital devices includes a first digital device 601, a second digital device 603, a third digital device 605, and a fourth digital device 607. The example of FIG. 6 includes a multichip module 600 comprising the digital devices 601, 603, 605, 607 similar to the multidevice module 101 of FIGS. 1 and 2. In FIG. 6, digital device 601 communicates with digital device 605 and digital device 607; digital device 603 communicates with digital device 605 and digital device 607; digital device 605 communicates with digital device 601 and digital device 603; and digital device 607 communicates with digital device 601 and digital device 603. Digital device 601 and digital device 603 do not communicate; digital device 605 and digital device 607 do not communicate.

In some examples, the components of the multidevice module 600 detect 602 relative clock skews among the plurality of digital devices using skew detectors on each digital device that detect the clock skew between a local clock of the digital device and the clocks of other digital devices with which the device communicates. That is each digital device 601, 603, 605, 607 detects the clock signal of each other digital device with which it is paired for communication, and compares those clocks signals to its own local clock to determine the skew. The skew is quantitively measured as the offset between the falling edges (or rising edges) of two clock signals. In some examples, the relative clock skews are detected 602 during a system initialization period where the clocks of the digital devices are set to a frequency that is lower than a typical operating frequence.

The method of FIG. 6 also includes deskewing 604, based on the relative clock skews, respective clock signals of the plurality of digital devices. In some examples, the digital devices 601, 603, 605, 607 deskew 604 their respective clock signals relative to other digital devices by inserting delay into their local clock signal. As discussed above, a deskew controller on each digital device 601, 603, 605, 607 uses the quantitative clock offsets output by the skew detectors to configure a programmable delay that adds or removes delay in the clock signal. The deskew operation is performed in stages. For example, in a first stage, each primary digital device 601, 603 (a noncommunicating pair) inserts an amount of delay that makes the clock signal of that digital device later than the clocks signals of both secondary digital devices 605, 607. In a second stage, the secondary digital devices 605, 607 minimize the skew with the adjusted clock signals of the primary digital devices 601, 603 by inserting delay. In a third stage, the primary digital devices 601, 603 minimize the skew in relation to the secondary digital devices. As a result, the noncommunicating primary digital devices 601, 603 are deskewed relative to one another and the noncommunicating secondary digital devices 605, 607 are deskewed relative to one another. In some examples, the deskew process is coordinated by a deskew orchestration program that communicates with the deskew controllers on each digital device. For example, each deskew controller may perform a particular stage of the deskew operation in response to a signal from the deskew orchestration program.

The method of FIG. 6 can also include setting 606 a target clock frequency in response to the deskewing. Once the deskew 604 process has completed, the digital devices are prepared to transition to an operational state. In some examples, each digital device 601, 603, 605, 607 is set to the target clock frequency for the operational state. In some implementations, the digital device 601, 603, 605, 607 set 606 the target clock frequency based on a received command, for example, from an operating system.

For further explanation, FIG. 7 sets forth another example method of clock synchronization in a multichip module in accordance with at least one embodiment of the present disclosure. The method of FIG. 7 extends the method of FIG. 6, in that detecting 602 relative clock skews among a plurality of digital devices based on a pairwise exchange of clock signals between digital devices the plurality of digital devices includes detecting 702, by the first digital device 601, a skew of a clock signal of the first digital device 601 with respective clock signals of third digital device 605 and the fourth digital device 607. In some examples, the skew detector on the first digital device 601 detects 702 the skew in relation to the third digital device 605 and the fourth digital device 607 by comparing the clock signal received from those devices to the local clock signal of the first digital device 601 and determining an offset between an edge of the local clock signal and a corresponding edge of the respective clock signals of the digital device 605 and the digital device 607. In some examples, the skew detector identifies a first offset of the local clock signal compared to the clock signal of the third digital device 605 and identifies a second offset of the local clock signal compared to the clock signal of the fourth digital device 607, and outputs a value for each offset. In other examples, the skew detector outputs the largest offset between the first offset and the second offset.

In the example of FIG. 7, detecting 602 relative clock skews also includes detecting 704, by the second digital device 603, a skew of a clock signal of the second digital device 603 with respective clock signals of the third digital device 605 and the fourth digital device 607. In some examples, the skew detector on the second digital device 603 detects 704 the skew in relation to the third digital device 605 and the fourth digital device 607 by comparing the clock signal received from those devices to the local clock signal of the second digital device 603 and determining an offset between an edge of the local clock signal and a corresponding edge of the respective clock signals of the third digital device 605 and the fourth digital device 607. In some examples, the skew detector identifies a first offset of the local clock signal compared to the clock signal of the third digital device 605 and identifies a second offset of the local clock signal compared to the clock signal of the fourth digital device 607, and outputs a value for each offset. In other examples, the skew detector outputs the largest offset between the first offset and the second offset.

In the example of FIG. 7, detecting 602 relative clock skews also includes detecting 706, by the third digital device 605, a skew of a clock signal of the third digital device 605 based on respective clock signals of the first digital device 601 and the second digital device 603. In some examples, the skew detector on the third digital device 605 detects 706 the skew in relation to the first digital device 601 and the second digital device 603 by comparing the clock signal received from those devices to the local clock signal of the third digital device 605 and determining an offset between an edge of the local clock signal and a corresponding edge of the respective clock signals of the first digital device 601 and the second digital device 603. In some examples, the skew detector identifies a first offset of the local clock signal compared to the clock signal of the first digital device 601 and identifies a second offset of the local clock signal compared to the clock signal of the second digital device 603, and outputs a value for each offset. In other examples, the skew detector outputs the largest offset between the first offset and the second offset.

In the example of FIG. 7, detecting 602 relative clock skews also includes detecting 708, by the fourth digital device 607, a skew of a clock signal of the fourth digital device 607 with respective clock signals of the first digital device 601 and the second digital device 603. In some examples, the skew detector on the fourth digital device 607 detects 708 the skew in relation to the first digital device 601 and the second digital device 603 by comparing the clock signal received from those devices to the local clock signal of the fourth digital device 607 and determining an offset between an edge of the local clock signal and a corresponding edge of the respective clock signals of the first digital device 601 and the second digital device 603. In some examples, the skew detector identifies a first offset of the local clock signal compared to the clock signal of the first digital device 601 and identifies a second offset of the local clock signal compared to the clock signal of the second digital device 603, and outputs a skew value for each digital device. In other examples, the skew detector outputs, as the skew value, the largest offset between the first offset and the second offset.

For further explanation, FIG. 8 sets forth another example method of clock synchronization in a multichip module in accordance with at least one embodiment of the present disclosure. The method of FIG. 7 extends the method of FIG. 6, in that deskewing 604, based on the relative clock skews, respective clock signals of the plurality of digital devices includes adjusting 802, by the first digital device 601 during a first adjustment phase, a clock signal of the first digital device 601 by inserting a delay based on a skew detected by the first digital device 601 with respect to the third digital device 605 and the fourth digital device 607. In some examples, the deskew controller of the first digital device 601 adjusts 802 the clock signal by configuring the programmable delay of the first digital device to insert delay that increases the clock latency of the clock signal of the first digital device. In some implementations, the deskew controller first increases the fine delay to 50% of the potential (e.g., by setting half of the transistors in the clock root to 'off'). If the clock of first digital device 601 is earlier than either the third digital device 605 or the fourth digital device 607, the deskew controller adds coarse delay until the clock of first digital device 601 is the latest clock. Even if the clock of the first digital device is already the latest clock, coarse delay may be added to allow flexibility for further clock adjustment.

In the method of FIG. 8, deskewing 604 respective clock signals of the plurality of digital devices also includes adjusting 804, by the second digital device 603 during the first adjustment phase, a clock signal of the second digital device 603 by inserting a delay based on the skew detected by the second digital device 603 with respect to the third digital device 605 and the fourth digital device 607. In some examples, the deskew controller of the second digital device 603 adjusts 804 the clock signal by configuring the programmable delay of the second digital device to insert delay that increases the clock latency of the clock signal of the second digital device. In some implementations, the deskew controller first increases the fine delay to 50% of the potential (e.g., by setting half of the transistors in the clock root to 'off'). If the clock the second digital device 603 is earlier than either the third digital device 605 or the fourth digital device 607, the deskew controller adds coarse delay until the clock of second digital device 603 is the latest clock. Even if the clock of the second digital device 603 is already the latest clock, coarse delay may be added to allow flexibility for further clock adjustment.

In the method of FIG. 8, deskewing 604, based on the relative clock skews, respective clock signals of the plurality of digital devices also includes adjusting 806, by the third digital device 605 during a second adjustment phase subsequent to the first adjustment phase, a clock signal of the third digital device 605 by inserting a delay based on a skew detected by the third digital device 605 with respect to the first digital device 601 and the second digital device 603. In some examples, the third digital device 605 adjusts 806 its clock by the deskew controller of the third digital device 605 configuring the programmable delay to add and/or remove delay to adjust the clock latency. In some implementations, the deskew controller adjusts its local clock to be the is the latest clock by adding coarse delay. The deskew controller then reduces the coarse delay by one step. If the local clock of the third digital device 605 is no longer the latest clock, the deskew controller then inserts fine delay until the local clock of third digital device 605 is deskewed relative to the latest clock among the first digital device 601 and the second digital device 603.

In the method of FIG. 8, deskewing 604, based on the relative clock skews, respective clock signals of the plurality of digital devices also includes adjusting 808, by the fourth digital device 607 during the second adjustment phase, a clock signal of the fourth digital device 607 by inserting a delay based on a skew detected by the fourth digital device 607 with respect to the first digital device 601 and the second digital device 603. In some examples, the fourth digital device 607 adjusts 808 its clock by the deskew controller of the fourth digital device 607 configuring the programmable delay to add and/or remove delay to adjust the clock latency. In some implementations, the deskew controller adjusts its local clock to be the is the latest clock by adding coarse delay. The deskew controller then reduces the coarse delay by one step. If the local clock of the fourth digital device 607 is no longer the latest clock, the deskew controller then inserts fine delay until the local clock of fourth digital device 607 is deskewed relative to the latest clock among the first digital device 601 and the second digital device 603.

In the method of FIG. 8, deskewing 604, based on the relative clock skews, respective clock signals of the plurality of digital devices also includes adjusting 810 further, by the first digital device 601 during a third adjustment phase subsequent to the second adjustment phase, the clock signal of the first digital device 601 by adding additional delay based on the skew detected by the first digital device 601 with respect to the third digital device 605 and the fourth digital device 607. In some examples, the first digital device 601 further adjusts 810 its clock to deskew relative to the adjust clocks of the third digital device 605 and the fourth digital device 607. In some implementations, the deskew controller adds coarse delay to an optimal setting to minimize skew relative to the third digital device 605 and the fourth digital device 607. That is, coarse delay is added such that the difference between the offsets of the clock edges, regardless of which clock is earlier or later, is the smallest. For example, adding coarse delay by one step may result in the clock of the first digital device 601 being 40 picoseconds earlier than the clocks of the third digital device 605 and the fourth digital device 607, and adding coarse delay by two steps may result in the clock of digital device being 10 picoseconds later than the clocks of the third digital device 605 and the fourth digital device 607, in which case adding two steps of coarse delay is the optimal amount. The optimal delay setting to minimize skew can be determined based on the outputs of the quantitative skew sensor or through a binary search to identify the smallest offset.

In the method of FIG. 8, deskewing 604, based on the relative clock skews, respective clock signals of the plurality of digital devices also includes adjusting 812 further, by the second digital device 603 during the third adjustment phase, the clock signal of the second digital device 603 by inserting an additional delay based on the skew detected by the second digital device 603 with respect to the third digital device 605 and the fourth digital device 607. In some examples, the second digital device 603 further adjusts 812 its clock to deskew relative to the adjust clocks of the third digital device 605 and the fourth digital device 607. In some implementations, the deskew controller adds coarse delay to an optimal setting to minimize skew relative to the third digital device 605 and the fourth digital device 607. That is, coarse delay is added such that the difference between the offsets of the clock edges, regardless of which clock is earlier or later, is the smallest. For example, adding coarse delay by one step may result in the clock of the second digital device 603 being 40 picoseconds earlier than the clocks of the third digital device 605 and the fourth digital device 607, and adding coarse delay by two steps may result in the clock of digital device being 10 picoseconds later than the clocks of the third digital device 605 and the fourth digital device 607, in which case adding two steps of coarse delay is the optimal amount. The optimal delay setting to minimize skew can be determined based on the outputs of the quantitative skew sensor or through a binary search to identify the smallest offset.

For further explanation, FIG. 9 sets forth another example method of clock synchronization in a multichip module in accordance with at least one embodiment of the present disclosure. The method of FIG. 9 extends the method of FIG. 6, in that the method of FIG. 9 also includes adjusting 902, by the first digital device 601, the clock signal of the first digital device 601 by inserting fine delay based on a jitter of the respective clock signals of the third digital device 605 and the fourth digital device 607. In some examples, the first digital device 601 adjusts 902 its clock signal by identifying a jitter in the clock signal of the third digital device 605 and the fourth digital device 607. In these examples, the first digital device 601 determines a center point of variation of the clock signals in the third digital device 605 and the fourth digital device 607, or determines an average skew between the first digital device 601 and the third digital device 605 and the fourth digital device 607. Based on the center point or average skew, the first digital device 601 identifies a target amount of delay to add its clock signal to minimize the skew of the clock signal of the first digital device 601 relative to the jitter in the third digital device 605 and the further digital device 607.

The method of FIG. 9 also includes adjusting 904, by the second digital device 603, the clock signal of the second digital device 603 by inserting fine delay based on a jitter of the respective clock signals of the third digital device 605 and the fourth digital device 607. In some examples, the second digital device 603 adjusts 904 its clock signal by identifying a jitter in the clock signal of the third digital device 605 and the fourth digital device 607. In these examples, the second digital device 603 determines a center point of variation of the clock signals in the third digital device 605 and the fourth digital device 607, or determines an average skew between the second digital device 603 and the third digital device 605 and the fourth digital device 607. Based on the center point or average skew, the second digital device 603 identifies a target amount of delay to add its clock signal to minimize the skew of the clock signal of the second digital device 603 relative to the jitter in the third digital device 605 and the further digital device 607.

Figure 10:
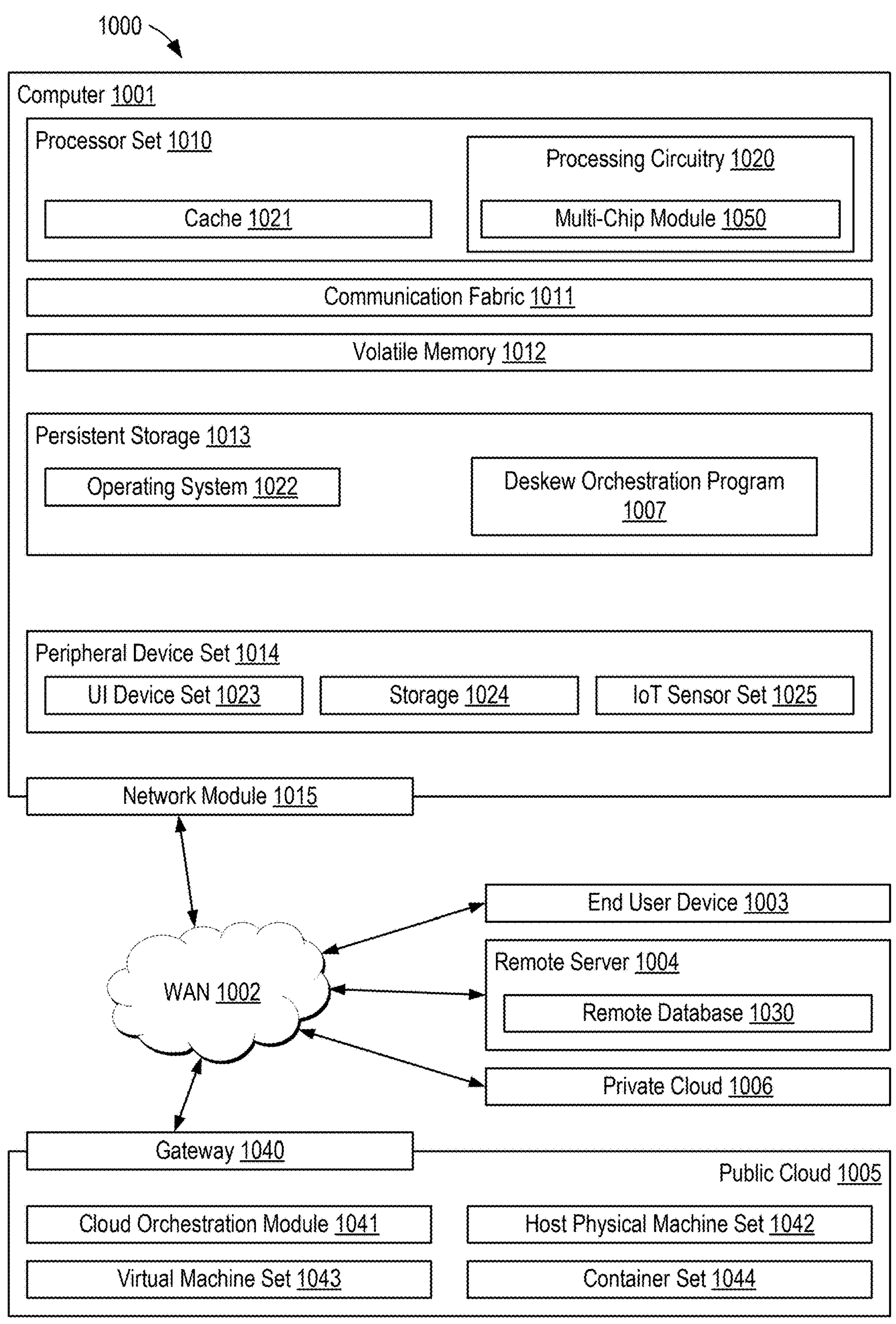
FIG. 10 sets forth an example computing environment for clock synchronization in a multichip module in accordance with aspects of the present disclosure.

FIG. 10 sets forth an example computing environment according to aspects of the present disclosure. Computing environment 1000 contains an example of an environment for the execution of at least some of the computer code involved in performing the various methods described herein, such as deskew orchestration program 1007. In addition to deskew orchestration program 1007, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and deskew orchestration program 1007, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Computer 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

Processor set 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. In some examples, processor set 1010 includes a multidevice module 1050, such as the multidevice module 101 in FIGS. 1 and 2, that includes four or more processors. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 1021 and the other storage media discussed below. The program instructions, and associated data, are accessed by processor set 1010 to control and direct performance of the computer-implemented methods. In computing environment 1000, at least some of the instructions for performing the computer-implemented methods may be stored in deskew orchestration program 1007 in persistent storage 1013.

Communication fabric 1011 is the signal conduction path that allows the various components of computer 1001 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

Persistent storage 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in deskew orchestration program 1007 typically includes at least some of the computer code involved in performing the computer-implemented methods described herein.

Peripheral device set 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database), this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

Network module 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the computer-implemented methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

Remote server 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

Public cloud 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (“CPP embodiment” or “CPP”) is a term used in the present disclosure to describe any set of one, or more, storage media (also called “mediums”) collectively included in a set of one, or more, storage devices that collectively include machine readable code corresponding to instructions and/or data for performing computer operations specified in a given CPP claim. A “storage device” is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

detecting relative clock skews among a plurality of digital devices based on a pairwise exchange of clock signals between digital devices, the plurality of digital devices comprising at least one noncommunicating pair of digital devices, wherein a digital device, of the plurality of digital devices, detects a skew of a clock signal of the digital device respective to clock signals of other digital devices of plurality of digital devices, and wherein the plurality of digital devices includes a first digital device, a second digital device, a third digital device, and a fourth digital device; and deskewing, based on the relative clock skews, respective clock signals of the plurality of digital devices.

2. The method of claim 1, wherein deskewing the respective clock signals of the plurality of digital devices includes:

detecting, by the first digital device, a skew of a clock signal of the first digital device respective to clock signals of third digital device and the fourth digital device;

detecting, by the second digital device, a skew of a clock signal of the second digital device respective to clock signals of the third digital device and the fourth digital device;

detecting, by the third digital device, a skew of a clock signal of the third digital device respective to clock signals of the first digital device and the second digital device; and detecting, by the fourth digital device, a skew of a clock signal of the fourth digital device respective to clock signals of the first digital device and the second digital device.

3. The method of claim 1 further comprising:

adjusting, by the first digital device during a first adjustment phase, a clock signal of the first digital device by inserting a delay based on a skew detected by the first digital device with respect to the third digital device and the fourth digital device;

adjusting, by the second digital device during the first adjustment phase, a clock signal of the second digital device by inserting a delay based on the skew detected by the second digital device with respect to the third digital device and the fourth digital device;

adjusting, by the third digital device during a second adjustment phase subsequent to the first adjustment phase, a clock signal of the third digital device by inserting a delay based on a skew detected by the third digital device with respect to the first digital device and the second digital device;

adjusting, by the fourth digital device during the second adjustment phase, a clock signal of the fourth digital device by inserting a delay based on a skew detected by the fourth digital device with respect to the first digital device and the second digital device;

adjusting further, by the first digital device during a third adjustment phase subsequent to the second adjustment phase, the clock signal of the first digital device by adding additional delay based on the skew detected by the first digital device with respect to the third digital device and the fourth digital device; and adjusting further, by the second digital device during the third adjustment phase, the clock signal of the second digital device by inserting an additional delay based on the skew detected by the second digital device with respect to the third digital device and the fourth digital device.

4. The method of claim 3, wherein, in each adjustment phase, a delay is inserted by inserting at least one of fine delay and coarse delay based on a largest detected skew.

5. The method of claim 3, wherein the deskewing occurs during system initialization; and wherein a second deskewing occurs during system operation.

6. The method of claim 4, wherein the delay is inserted in accordance with a number of delay steps, wherein each delay step corresponds to a time interval, and wherein fine delay steps correspond to a shorter time interval than coarse delay steps.

7. The method of claim 4, wherein inserting the delay in the first adjustment phase includes inserting fifty percent of available fine delay and optional inserting coarse delay.

8. The method of claim 4, wherein inserting the delay in the second adjustment phase includes inserting course delay and then increasing or decreasing fine delay.

9. The method of claim 4, wherein inserting the delay in the third adjustment phase includes increasing coarse delay to an optimal setting.

10. The method of claim 5, wherein the second deskewing includes:

adjusting, by the first digital device, the clock signal of the first digital device by inserting fine delay based on a jitter of the respective clock signals of the third digital device and the fourth digital device; and adjusting, by the second digital device, the clock signal of the second digital device by inserting fine delay based on a jitter of the respective clock signals of the third digital device and the fourth digital device.

11. An apparatus comprising:

a multi-device module comprising a plurality of digital devices including:

a first digital device communicatively coupled to a third digital device and a fourth digital device;

a second digital device communicatively coupled to the third digital device and the fourth digital device;

the third digital device communicatively coupled to the first digital device and the second digital device; and the fourth digital device communicatively coupled to the first digital device and the second digital device;

wherein the multi-device module is configured to:

detect relative clock skews among the plurality of digital devices based on a pairwise exchange of clock signals between digital devices, the plurality of digital devices comprising at least one noncommunicating pair of digital devices;

deskew, based on the relative clock skews, respective clock signals of the plurality of digital devices; and set a target clock frequency in response to the deskewing.

12. The apparatus of claim 11, wherein each of the plurality of digital devices comprises a clock tree, a programmable delay coupled to the clock tree, a skew controller coupled to the programmable delay, and one or more skew detectors coupled to the skew controller, the clock tree, and receiving one or more external clock signals from another digital device.

13. The apparatus of claim 11, wherein to detect the relative clock skews:

the first digital device detects a skew of a clock signal of the first digital device respective to clock signals of third digital device and the fourth digital device;

the second digital device detects a skew of a clock signal of the second digital device respective to clock signals of the third digital device and the fourth digital device;

the third digital device detects a skew of a clock signal of the third digital device respective to clock signals of the first digital device and the second digital device; and the fourth digital device detects a skew of a clock signal of the fourth digital device respective to clock signals of the first digital device and the second digital device.

14. The apparatus of claim 11, wherein to deskew the respective clock signals:

the first digital device adjusts, during a first adjustment phase, a clock signal of the first digital device by inserting a delay based on a skew detected by the first digital device with respect to the third digital device and the fourth digital device;

the second digital device adjusts, during the first adjustment phase, a clock signal of the second digital device by inserting a delay based on the skew detected by the second digital device with respect to the third digital device and the fourth digital device;

the third digital device adjusts, during a second adjustment phase subsequent to the first adjustment phase, a clock signal of the third digital device by inserting a delay based on a skew detected by the third digital device with respect to the first digital device and the second digital device;

the fourth digital device adjusts, during the second adjustment phase, a clock signal of the fourth digital device by inserting a delay based on a skew detected by the fourth digital device with respect to the first digital device and the second digital device;

the first digital device further adjusts, during a third adjustment phase subsequent to the second adjustment phase, the clock signal of the first digital device by adding additional delay based on the skew detected by the first digital device with respect to the third digital device and the fourth digital device; and the second digital device further adjusts, during the third adjustment phase, the clock signal of the second digital device by inserting an additional delay based on the skew detected by the second digital device with respect to the third digital device and the fourth digital device.

15. The apparatus of claim 11, wherein the apparatus is configured to set a target clock frequency in response to the deskewing.

16. The apparatus of claim 14, wherein, in each adjustment phase, a delay is inserted by inserting at least one of fine delay and coarse delay based on a largest detected skew.

17. The apparatus of claim 14 further comprising:

a deskew scheduling module configured to initiate the deskew in each digital device in succession according to each adjustment phase, wherein the deskew scheduling module is coupled to a deskew controller on each digital device.

18. The apparatus of claim 15, wherein the deskewing includes:

adjusting, by the first digital device, the clock signal of the first digital device by inserting fine delay based on a jitter of the respective clock signals of the third digital device and the fourth digital device; and adjusting, by the second digital device, the clock signal of the second digital device by inserting fine delay based on a jitter of the respective clock signals of the third digital device and the fourth digital device.

19. The apparatus of claim 16, wherein the delay is inserted in accordance with a number of delay steps, wherein each delay step corresponds to a time interval, and wherein fine delay steps correspond to a shorter time interval than coarse delay steps.

20. A digital device comprising:

a quantitative skew detector configured to detect amounts of clock skew between a local clock signal and respective clock signals of at least two other digital devices;

a programmable delay configured to increase and decrease clock latency in the digital device by inserting coarse delay and fine delay into a clock signal path; and a deskew controller configured to receive the amounts of clock skew and configure the programmable delay to insert delay based on the amounts of clock skew, the deskew controller further configured to:

adjust, during a first initialization phase, a clock signal of the digital device by inserting a combination of coarse delay and fine delay based on the amounts of skew detected by the digital device with respect to a second digital device and a third digital device;

adjust, in a subsequent initialization phase, the clock signal of the digital device by adding additional coarse delay based on the skew detected by the digital device with respect to a second digital device and a third digital device; and adjust, during an operational phase, the clock signal of the digital device by adjusting an amount of fine delay applied to the clock signal based on a jitter detected in respective clock signals of the second digital device and the third digital device.

* * * * *